United States Patent

Salmon, Jr. et al.

[11] 3,922,101
[45] Nov. 25, 1975

[54] CONNECTOR MEANS FOR HOLLOW RECTANGULAR TUBING

[75] Inventors: Garland R. Salmon, Jr.; Marshall C. Sutherland, Jr., both of Durham, N.C.

[73] Assignee: Marshall C. Sutherland, Jr., Durham, N.C.

[22] Filed: Sept. 9, 1974

[21] Appl. No.: 504,720

[52] U.S. Cl. ............................ 403/292; 403/408
[51] Int. Cl.² .................................... F16B 7/00
[58] Field of Search ......... 285/397, 404, 398, 424, 285/370, 371; 403/405, 406, 407, 408, 403, 292, 293, 294, 295, 296, 297, 298; 182/178

[56] References Cited
UNITED STATES PATENTS

| | | | |
|---|---|---|---|
| 620,834 | 3/1899 | Belcher et al. | 285/397 X |
| 1,885,231 | 11/1932 | Chong et al. | 403/408 |
| 3,486,751 | 12/1969 | Hutfield et al. | 285/397 X |
| 3,598,349 | 8/1971 | Drake | 403/292 X |

FOREIGN PATENTS OR APPLICATIONS

| 226,901 | 2/1960 | Australia | 182/178 |
|---|---|---|---|

*Primary Examiner*—Dave W. Arola
*Attorney, Agent, or Firm*—B. B. Olive

[57] ABSTRACT

A connector for connecting two pieces of hollow, aligned, rigid, rectangular tubing comprises an insert bar of rectangular cross section and having a central threaded hole and adapted to be fitted inside the tubes at the point of connection, a threaded screw and a dish-shaped resilient washer. The screw is secured to the bar and tightens the washer which holds the tubes together when the screw is tightened.

1 Claim, 5 Drawing Figures

CONNECTOR MEANS FOR HOLLOW RECTANGULAR TUBING

BACKGROUND OF THE INVENTION

1. Field of the Invention

This invention relates to devices for connecting aligned, hollow, rigid tubes and particularly hollow tubes of rectangular cross section.

2. Description of the Prior Art

Rigid hollow tubes have been aligned and joined in various ways including welding, bolting, and telescoping The telephone industry, in particular, uses substantial quantities of hollow, rigid, rectangular-shaped metal tubes and none of the existing conventional methods provide a connection which is both inexpensive and can be simply and quickly achieved.

SUMMARY OF THE INVENTION

The present invention includes a rigid insert bar member adapted to be inserted into the opposed hollow ends of two modified tubes and in particular the opposing hollow ends of two hollow rectangular tubes modified to contain a centrally located, semi-circular notch configuration in one sidewall. The bar insert member is provided with a centrally located threaded hole adapted to receive and hold a threaded screw which has previously been fitted with a resilient dish or concave-shaped washer. The screw and washer combination is first attached to the insert bar member after which the ends of the insert bar member are inserted into the opposing ends of the two notched rectangular tubes. The rigid tubes are then aligned and made to slide together to enclose the insert bar member and reach a point where the end of one tube contacts the end of the other tube and the respective tube notches surround the threaded shaft of the screw. The screw is then tightened into the hole of the insert bar member to exert pressure on the washer which in turn causes sufficient internal and external pressure to be exerted on the contacted sidewalls of the opposed tubes to effect a joint and permanent alignment.

Advantages of the invention will become apparent when the following detailed description is read in conjunction with the appended drawings and claims. A preferred embodiment of the invention will now be described with reference to the accompanying drawings.

DESCRIPTION OF THE PREFERRED EMBODIMENT

Figure 1:
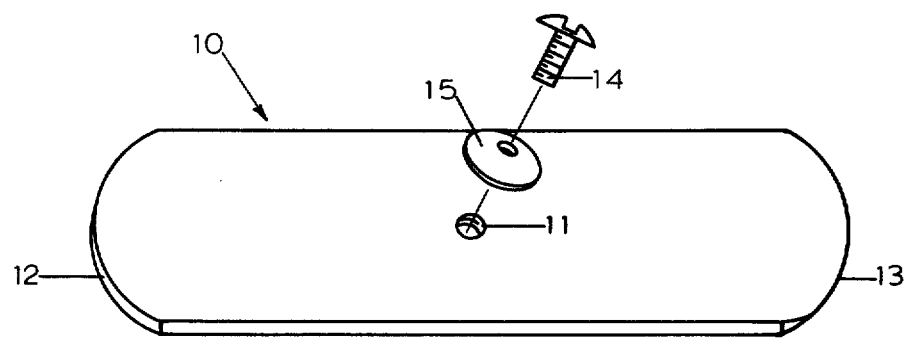
FIG. 1 is a perspective exploded view of the insert bar member with screw and washer detached.

Referring to the drawings and specifically to FIG. 1, insert bar member 10 is seen to be substantially rectangular in plan and cross section. A threaded hole 11 is centrally located therein and ends 12 and 13 are curved as shown to facilitate insertion. Threaded screw 14 is adapted to be fitted through resilient concave or dish-shaped washer 15 and then into threaded hole 11 of insert bar member 10. After being fitted into threaded hole 11, screw 14 with attached washer 15 is partially turned therein.

Figure 2:
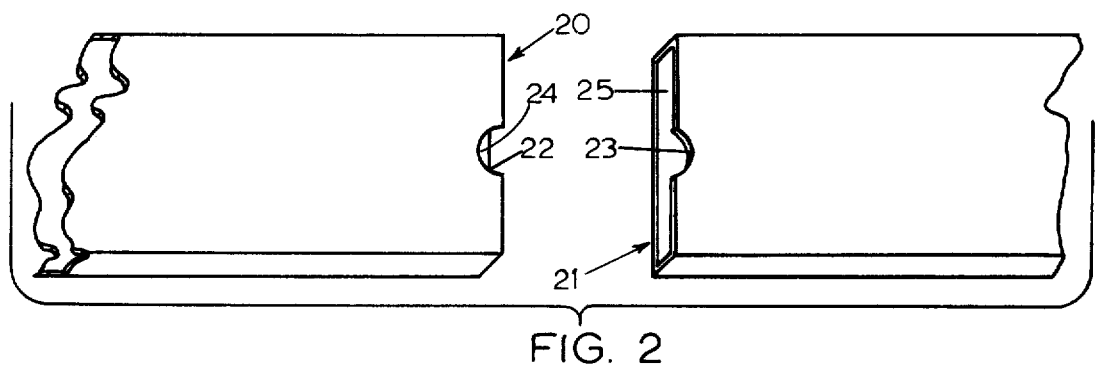
FIG. 2 is a perspective view of two hollow rectangular tubes modified with notches.

Referring now to FIG. 2, there are shown end portions of two hollow rectangular tubes 20 and 21 of a type commonly used in the telephone industry, but modified with notches for purposes of the invention. The end edge of one sidewall of tube 20 contains a centrally located, semi-circular notch 22. In a like manner notch 23 is located on an abutting sidewall edge of tube 21. The notches are positioned to be mated to form a hole to allow the threaded shaft of screw 14 to pass when the opposing ends of tubes 20 and 21 are joined. The respective hollow interior voids 24 and 25 of each respective tube receive the respective curved ends 12 and 13 of insert bar member 10 such that equal portions of bar member 10 extend into the tubes.

Figure 3:
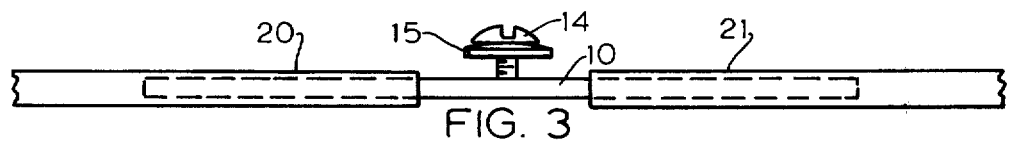
FIG. 3 is a side elevation of the modified rectangular tubes depicting the insert bar member with screw and washer attached and inserted into the tubes.

Referring now to FIG. 3, screw 14 is shown inserted through resilient washer 15 with its concave face opposite insert bar 10. Screw 14 is also partially turned into hole 11 of insert bar member 10 which in this view is shown loosely inserted into the opposing ends of aligned rectangular tubes 20 and 21 as shown by dashed lines. Insert bar member 10 is dimensioned so as to allow such a loosely fitted enclosure by tubes 20 and 21.

Rigid tubing of a type adapted to utilize the invention in the telephone industry is usually made of metal, e.g., steel. In conjunction with such tubing, the connector insert bar 10 and screw 14 may be made of the same or other material, e.g., brass, and the washer 15 may be made of resilient rubber, neoprene, or the like. The tubing is normally hollow but rigid in nature, as explained, while the connector should be solid and rigid to be most effective.

Figure 4:
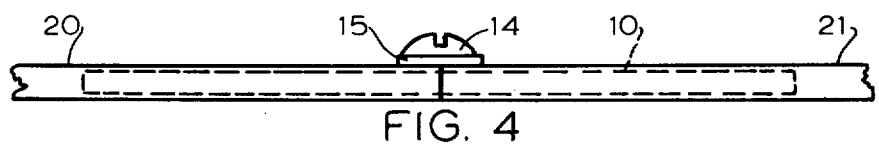
FIG. 4 is a side elevation of the modified rectangular tubes after being joined with the insert bar member enclosed by the tubes and the screw tightened down.

FIG. 4 depicts a completed jointing of tubes 20 and 21 after each has been slid together and firmly abutted as shown by the accompanying arrows. It will be noted that each tube encloses half the body of insert member 10 as shown by dashed lines. Screw 14 has been fully tightened down into hole 11 so that considerable pressure is exerted on resilient washer 15 whose concave face collapses and flattens against tubes 20, 21.

Figure 5:
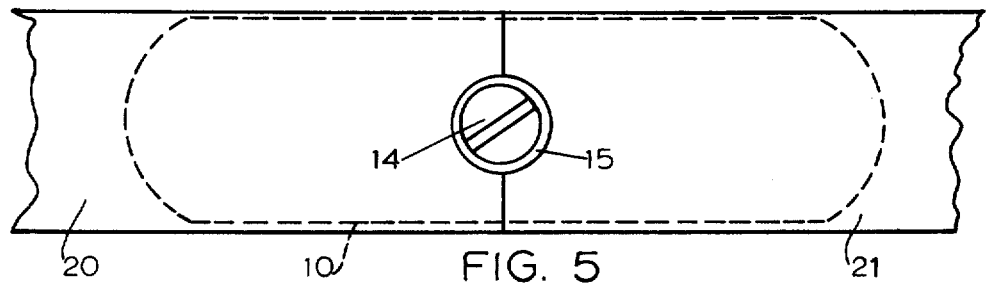
FIG. 5 is a top view of the modified rectangular tubes after being joined with the insert bar member enclosed by the tubes and the screw tightened down.

FIG. 5 is a top view of a completed joining of the modified rectangular tubes 20 and 21 and in secured alignment. Insert bar member 10 is now completely enclosed by tubes 20 and 21 and is shown by dashed lines. Screw 14 is now to be assumed as being fully tightened into hole 11 and to be exerting considerable pressure on resilient washer 15 to effect a secure and simple connection between the tubes in a manner not heretofore obtained. In the final joint the bar member 10 presses against the interior of the respective notched sidewalls and washer 15 presses against the exterior of such sidewalls to complete the alignment and securement.

What is claimed is:

1. In a structure employing hollow rectangular tubing as structural members, in combination:

a. a first hollow rigid tube of rectangular cross section and having an end to be abutted to an end of another tube of similar construction, said end including in one sidewall of said tube adjacent the end edge thereof a centrally positioned, semi-circular notch adapted to loosely receive the shaft portion of a screw member;

b. a second hollow rigid tube of the same said rectangular cross section and having an end to be abutted and joined to said first tube end and having a said notch similarly positioned and sized to mate with the notch of said first tube;

c. a solid rigid rectangular bar member having equal rounded end portions adapted to be loosely inserted within the respective said tube ends, said bar member having a threaded hole located midway of its length and width and extending perpendicularly of the sidewalls thereof;

d. a screw member having a threaded shaft and a screw head for turning, said screw member shaft being adapted to being loosely received by said notches and to being threadably mounted in said threaded hole; and e. a dish-shaped resilient washer fitted on said shaft and being adapted when said tube ends are firmly abutted and said screw head is fully turned to flatten and press against the exterior of the respective notched sidewalls of the said tubes and cause said bar member to press against the interior of said respective notched sidewalls to permanently secure and align such tubes.

* * * * *